United States Patent [19]

Takeo et al.

[11] Patent Number: 4,608,551

[45] Date of Patent: Aug. 26, 1986

[54] SPEED ALARM SYSTEM FOR AUTOMOTIVE VEHICLE

[75] Inventors: Yuji Takeo, Toyokawa; Tomohisa Yoshimi, Gamagoori, both of Japan

[73] Assignee: Nippondenso Co., Ltd., Kariya, Japan

[21] Appl. No.: 627,617

[22] Filed: Jul. 3, 1984

[30] Foreign Application Priority Data

Jul. 5, 1983 [JP] Japan .................... 58-122079
May 1, 1984 [JP] Japan .................... 59-89120

[51] Int. Cl.$^4$ .......................................... B60Q 1/00
[52] U.S. Cl. .......................................... 340/53; 340/62; 180/171
[58] Field of Search .................... 340/53, 52 R, 62; 180/170, 171; 307/10 R; 116/37, 57

[56] References Cited

U.S. PATENT DOCUMENTS

| | | | |
|---|---|---|---|
| 4,124,840 | 11/1978 | Kobayashi | 340/53 X |
| 4,143,352 | 3/1979 | Jarmotz | 340/53 |
| 4,189,706 | 2/1980 | Knox | 340/53 |
| 4,317,864 | 1/1983 | Kawasaki et al. | 340/53 X |
| 4,433,746 | 2/1984 | Steel | 340/53 X |

Primary Examiner—James L. Rowland
Assistant Examiner—Jeffery A. Hofsass
Attorney, Agent, or Firm—Cushman, Darby & Cushman

[57] ABSTRACT

In a speed alarm system for an automotive vehicle, a speed signal and a first command speed signal indicative of a first command speed are produced, and a speed width signal indicative of a predetermined speed width is produced. A value of the speed width signal is added to a value of the first command speed signal to produce a second command speed signal indicative of a second command speed. A first output signal is produced when a value of the speed signal exceeds the first command speed, and a second output signal is produced when a value of the speed signal exceeds the second command speed. First and second alarm sounds are generated in response to the first and second output signals for first and second predetermined alarm times respectively.

9 Claims, 16 Drawing Figures

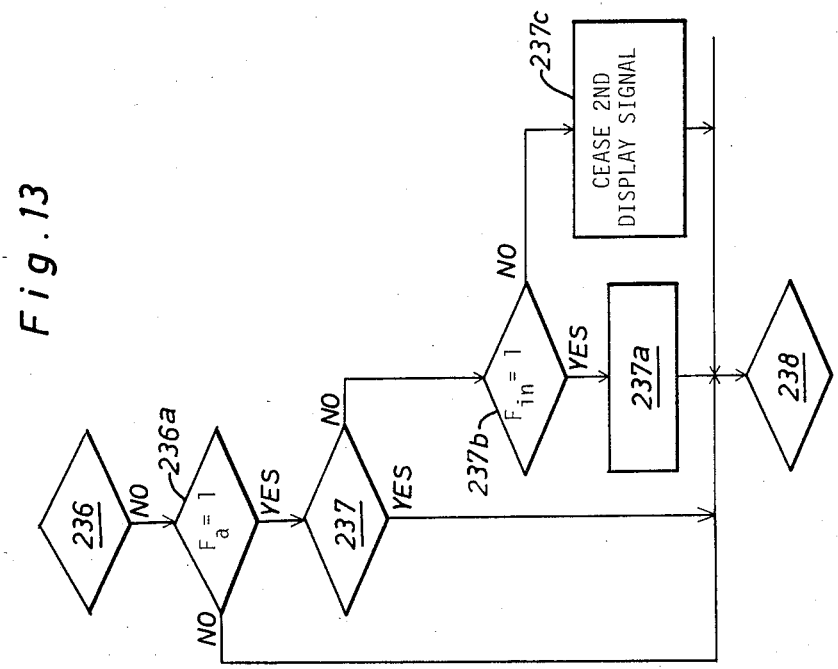
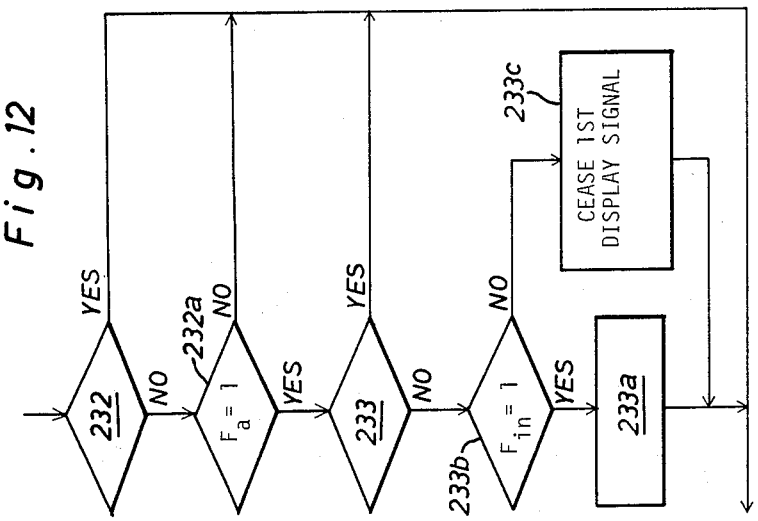

1

SPEED ALARM SYSTEM FOR AUTOMOTIVE VEHICLE

BACKGROUND OF THE INVENTION

The present invention relates to a speed alarm system for an automotive vehicle, and more particularly to a speed alarm system adapted to an automotive vehicle for issuing an alarm sound when the actual speed of the vehicle exceeds a speed limit.

As is well known in the prior art, a conventional speed alarm system of this kind is arranged to continuously issue an alarm sound while the actual speed of the vehicle exceeds a desired or command speed. Such a continuous alarm sound will extremely offend the ear of the driver and passengers. Furthermore, the driver cannot recognise an increasing width of the actual speed over the command speed because the command speed is determined in a fixed value.

SUMMARY OF THE INVENTION

It is, therefore, a primary object of the present invention to provide a speed alarm system for an automotive vehicle capable of issuing a first alarm sound for a first predetermined alarm time when the actual vehicle speed exceeds a first command speed, and further issuing a second alarm sound for a second predetermined alarm time when the actual vehicle speed exceeds a second command speed higher than the first command speed.

It is another object of the present invention to provide a speed alarm system for an automotive vehicle, having the above-mentioned characteristics, capable of selectively displaying the first and second command speeds in response to change of the actual vehicle speed.

It is a further object of the present invention to provide a speed alarm system for an automotive vehicle, having the above-mentioned characteristics, capable of intermittently displaying the respective first and second command speeds.

It is a still further object of the present invention to provide a speed alarm sytem for an automotive vehicle, having the above-mentioned characteristics, capable of displaying the actual vehicle speed.

According to the present invention there is provided a speed alarm system for an automotive vehicle, which comprises:

first means for producing a speed signal indicative of the actual speed of the vehicle;

second means for producing a first command speed signal indicative of a first command speed;

third means for producing a speed width signal indicative of a predetermined speed width;

fourth means for adding a value of the speed width signal to a value of the first command speed signal to produce a second command speed signal indicative of a second command speed defined by the added value;

fifth means for producing a first output signal when a value of the speed signal exceeds the first command speed, and for maintaining it for a first predetermined alarm time;

sixth means for producing a second output signal when the value of the speed signal exceeds the second command speed, and for maintaining it for a second predetermined alarm time; and seventh means responsive to the first and second output signals for generating first and second alarm sounds respectively.

The speed alarm system further comprises:

eighth means for producing a first command speed display signal indicative of the first command speed and maintaining it until the value of the speed signal reaches the value of the second command speed signal, the eighth means further producing a second command speed display signal indicative of the second command speed when the value of the speed signal exceeds the value of the second command speed signal and maintaining the second command speed display signal while the value of the speed signal is maintained in a value larger than the value of the first command speed signal; and display means responsive to the first and second command speed display signals for displaying the first and second command speeds respectively.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 12 to 14 illustrate partial flow diagrams defining a modification of the main control program;

DESCRIPTION OF THE PREFERRED EMBODIMENTS

Figure 1:
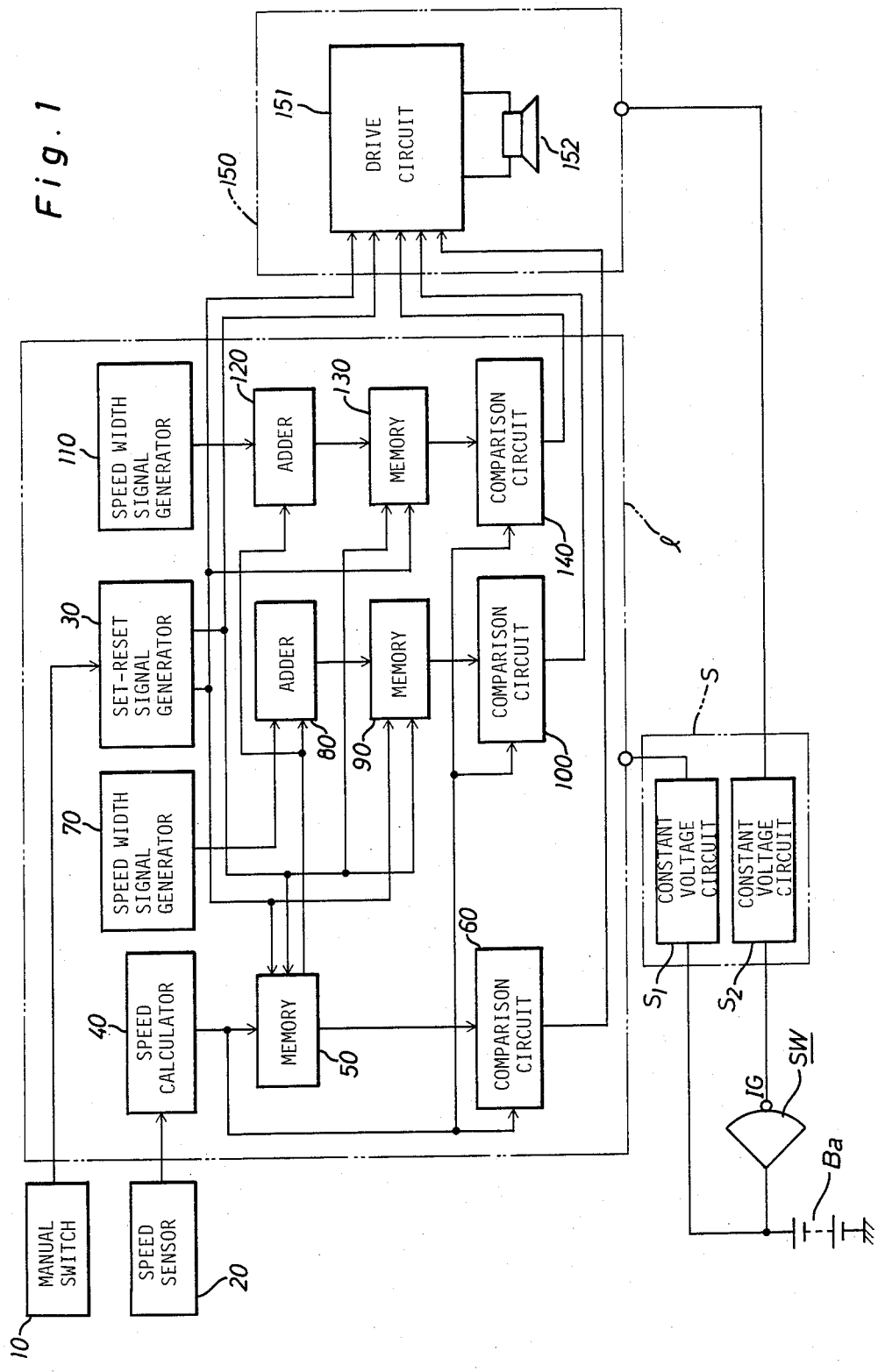
FIG. 1 illustrates a block diagram of a first preferred embodiment of a speed alarm system in accordance with the present invention adapted to an automotive vehicle.

Referring now to FIG. 1 of the drawings, there is illustrated a first preferred embodiment of a speed alarm system for an automotive vehicle in accordance with the present invention. The speed alarm system comprises a manual switch 10 of the self-return push button type, a speed sensor 20, a set-reset signal generator 30 connected to manual switch 10, and a speed calculator 40 connected to speed sensor 20. The manual switch 10 is mounted on a steering wheel of the vehicle to generate an actuation signal while it is continuously actuated for a predetermined duration time to set first to third command speeds V1, V2 and V3 or it is continuously actuated over the predetermined duration time to cancel the first to third command speeds V1, V2 and V3. The speed sensor 20 detects the actual travel speed V of the vehicle to generate a series of pulse signals respectively with a frequency proportional to the detected vehicle speed V. The set-reset signal generator 30 is responsive to the actuation signal from manual switch 10 to generate a set signal. Upon lapse of two seconds after generation of the actuation signal, the set-reset signal generator 30 ceases generation of the set signal and subsequently generates a reset signal until disappearance of the actuation signal from manual switch 10. The speed calculator 40 is responsive to the pulse signals from speed sensor 20 to repetitively calculate the actual vehicle speed V so as to produce a speed signal indicative of the actual vehicle speed V.

Figure 2:
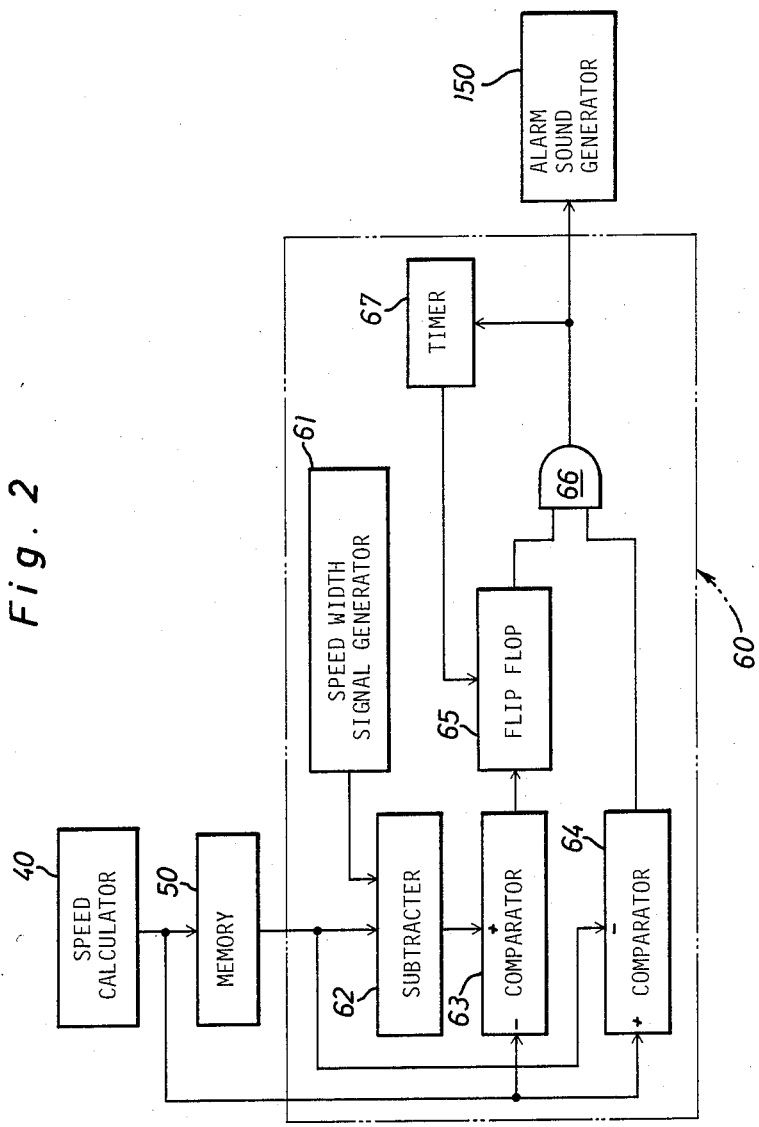
FIGS. 2 to 4 illustrate detailed circuit diagrams of the respective comparison circuits shown in FIG. 1.

The speed alarm system further comprises a memory 50 connected to the set-reset signal generator 30 and speed calculator 40, and a comparison circuit 60 connected to the speed calculator 40 and memory 50. Assuming that the manual switch 10 is actuated when the vehicle speed reaches the first command speed V1, the memory 50 memorizes therein a value of the speed signal from calculator 40 in response to the set signal from set-reset signal generator 30 to produce a first command speed signal indicative of the first command speed V1. The memory 50 cancels the memorized value in response to the reset signal from set-reset signal generator 30. As shown in FIG. 2, the comparison circuit 60 includes a speed width signal generator 61 which generates a speed width signal indicative of a predetermined speed width or range, for instance 3 Km/h, of the vehicle. A subtracter 62 calculates a difference between a value of the first command speed signal from memory 50 and a value of the speed width signal from generator 61 to produce a hysteresis signal indicative of the calculated difference.

A comparator 63 compares the speed signal from calculator 40 with the hysteresis signal from subtracter 62 to generate a high level signal when a value of the speed signal is smaller than a value of the hysteresis signal. The high level signal from comparator 63 disappears when the value of the speed signal from calculator 40 is larger than the value of the hysteresis signal from subtracter 62. A comparator 64 compares the speed signal from calculator 40 with the first command speed signal from memory 50 to generate a high level signal when the value of the speed signal is larger than a value of the first command speed signal. The high level signal from comparator 64 disappears when the value of the speed signal from calculator 40 is smaller than the value of the first command speed signal from memory 50. This means that both the high level signals from comparators 63, 64 disappear when the value of the speed signal from calculator 40 is maintained in the predetermined speed width or range defined by the value of the hysteresis signal from subtracter 61 and the value of the first command speed signal from memory 50. A flip flop 65 is responsive to the high level signal from comparator 63 to produce a high level signal which disappears in response to a timer signal issued from a timer 67, as described below. An AND gate 66 is responsive to both the high level signals from the comparator 64 and flip flop 65 to generate a high level or output signal which disappears in response to disappearance of one of both the high level signals from the comparator 64 and flip flop 65. The timer 67 is reset in response to the output signal from AND gate 66 to measure a predetermined alarm time of, for instance, two seconds so as to produce the timer signal upon completing measurement of the predetermined alarm time.

Figure 3:
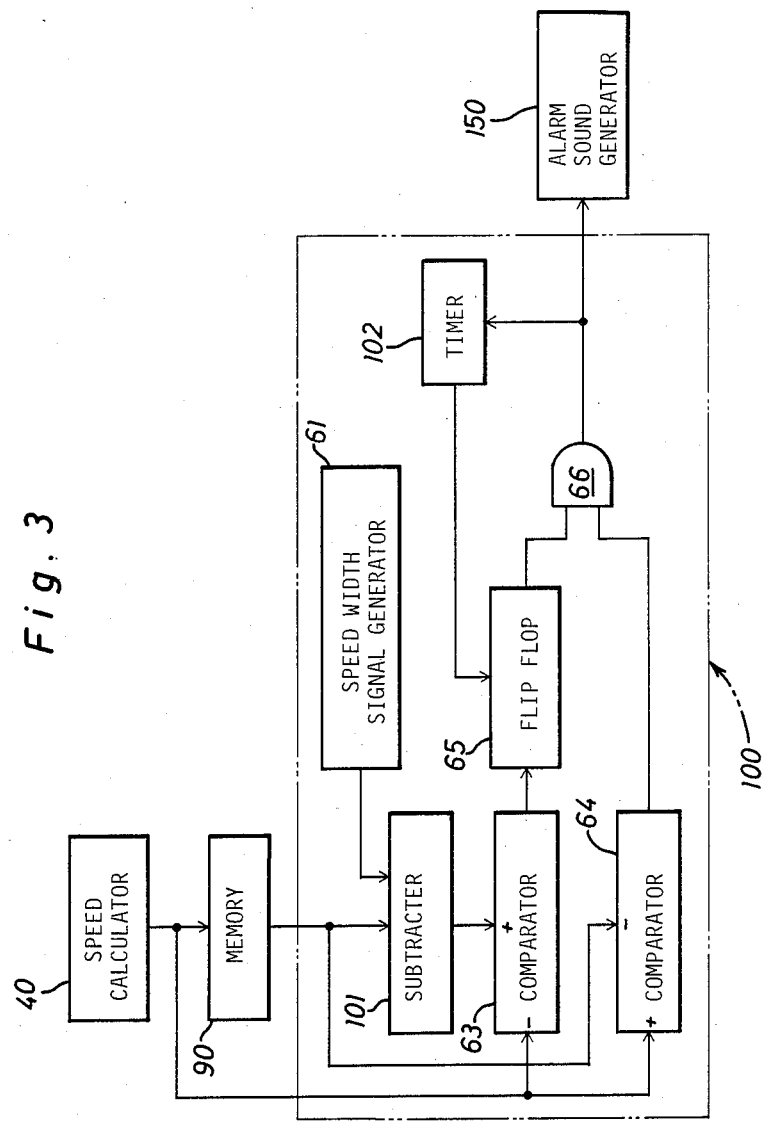

The speed alarm system comprises a speed width signal generator 70, an adder 80 connected to the memory 50 and speed width signal generator 70, a memory 90 connected to the set-reset signal generator 30 and adder 80, and a comparison circuit 100 connected to the speed calculator 40 and memory 90 (see FIG. 1). The speed width signal generator 70 produces a speed width signal indicative of a predetermined speed width, for instance, 10 Km/h of the vehicle. The adder 80 adds a value of the speed width signal from generator 70 to the value of the first command speed signal from memory 50 to produce an addition signal indicative of the added resultant value. The memory 90 is responsive to the set signal from generator 30 to memorize therein a value of the addition signal from adder 80 and produces a second command speed signal indicative of the memorized value or second command speed V2 which is cancelled in response to the reset signal from set-reset signal generator 30. As shown in FIG. 3, the comparison circuit 100 includes a subtracter 101 which calculates a difference between a value of the second command speed signal from memory 90 and a value of the speed width signal from speed width signal generator 61 of comparison circuit 100 to produce a hysteresis signal indicative of the calculated difference to be applied to the comparator 63 of comparison circuit 100. A timer 102 is reset in response to the output signal from AND gate 66 of comparison circuit 100 to measure a predetermined alarm time of, for instance, six seconds. Upon completing measurement of the predetermined alarm time of six seconds, the timer 102 generates a timer signal to be applied to flip flop 65 of comparison circuit 100. Other construction and function of comparison circuit 100 are the same as those of comparison circuit 60.

Figure 4:
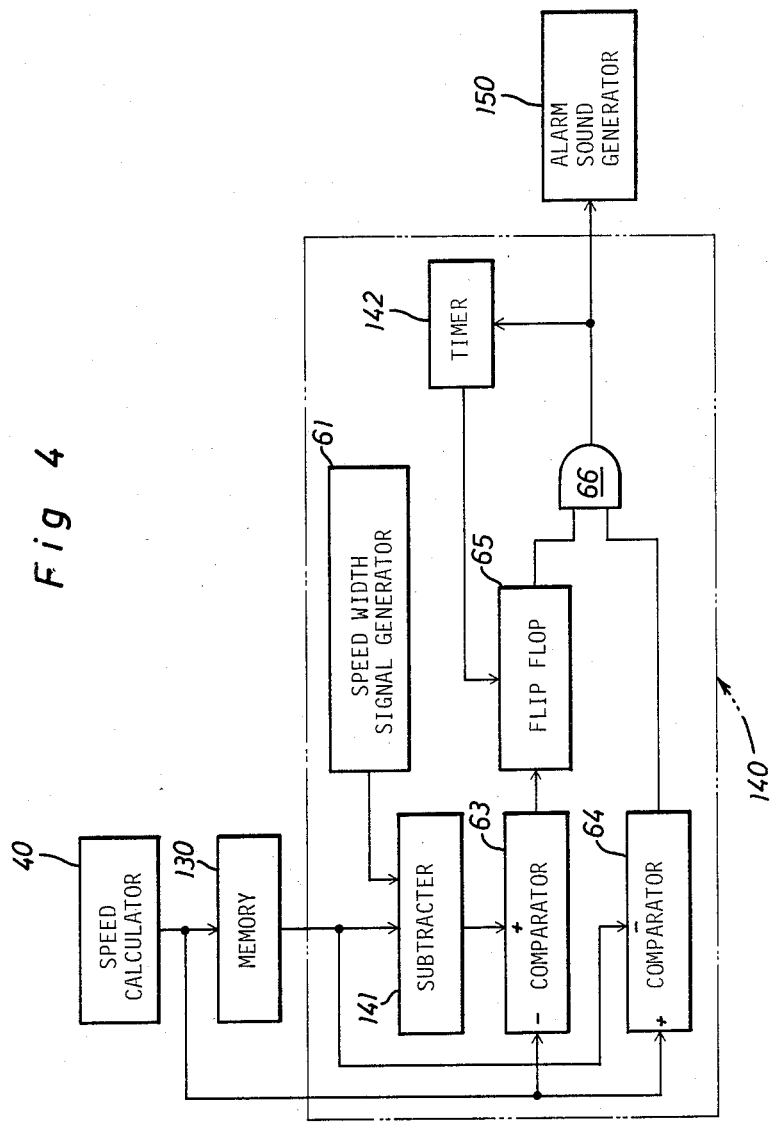

The speed alarm system comprises a speed width signal generator 110, an adder 120 connected to the memory 50 and speed width signal generator 110, a memory 130 connected to the set-reset signal generator 30 and adder 120, and a comparison circuit 140 connected to the speed calculator 40 and memory 130 (see FIG. 1). The speed width signal generator 110 produces a speed width signal indicative of a predetermined speed width, for instance, 25 Km/h of the vehicle. The adder 120 adds a value of the speed width signal from generator 110 to the value of the first command speed signal from memory 50 to produce an addition signal indicative of the added resultant value. The memory 130 memorises a value of the addition signal from adder 120 in response to the set signal from set-reset signal generator 30 to produce a third command speed signal indicative of the memorized value or third command speed V3. The memory 130 cancels the memorized third command speed V3 in response to the reset signal from set-reset signal generator 30. As shown in FIG. 4, the comparison circuit 140 includes a subtracter 141 which calculates a difference between a value of the third command speed signal from memory 130 and the value of the speed width signal from the speed width signal genrator 61 of comparison circuit 140 to produce a hysteresis signal indicative of the calculated difference to be applied to the comparator 63 of comparison circuit 140. A timer 142 is reset in response to the output signal from AND gate 66 of comparison circuit 140 to measure a predetermined alarm time of, for instance, eight seconds. Upon completing measurement of the predetermined alarm time of eight seconds, the timer 142 generates a timer signal to be applied to the flip flop 65 of comparison circuit 140. Other construction and function of comparison circuit 140 are the same as those of comparison circuit 60.

As shown in FIGS. 1 to 4, the speed alarm system comprises an alarm sound generator 150 which is provided with a drive circuit 151 connected to the set-reset signal generator 30 and comparison circuits 60, 100, 140 and also with a speaker 152 connected to the drive circuit 151. The drive circuit 151 is responsive to the set and reset signals from set-reset signal generator 30 respectively to generate first and second drive signals respectively indicative of alarm sounds A and B. The drive circuit 151 is also responsive to the output signals from comparison circuits 60, 100, 140 respectively to generate third, fourth and fifth drive signals respectively indicative of alarm sounds C, D and E. In the embodiment, the alarm sounds A to E are predetermined different from each other. The speaker 152 is mounted on a proper portion in a compartment of the vehicle and audibly generates the alarm sounds A to E respectively in response to the first to fifth drive signals from drive circuit 151.

As shown in FIG. 1, a voltage stabilizer S includes a constant voltage circuit S1 which directly receives an electric power from a battery Ba of the vehicle to produce a first constant voltage. This means that the electric circuits surrounded by a two dotted line 1 are always conditioned in operation upon receipt of the first constant voltage from constant voltage circuit S1. The voltage stabilizer S also includes a constant voltage circuit S2 which receives the electric power from battery Ba through a terminal IG of an ignition switch SW of the vehicle upon closure of the switch SW to produce a second constant voltage. This means that the alarm sound generator 150 is conditioned in operation upon receipt of the second constant voltage from constant voltage circuit S2.

OPERATION

During travel of the vehicle with the ignition switch SW closed, the speed calculator 40 cooperates with the speed sensor 20 to repetitively calculate the actual vehicle speed V so as to produce a speed signal indicative of the actual vehicle speed V. When the actual vehicle speed V reaches a desired or first command speed V1, the manual switch 10 is actuated for a time of less than two seconds to generate an actuation signal. Then, the set-reset signal generator 30 is responsive to the actuation signal from manual switch 10 to produce a set signal upon receipt of which the memory 50 memorizes a value of the speed signal from calculator 40 to generate a first command speed signal indicative of the memorized value or first command speed V1.

The adder 80 is responsive to the first command speed signal from memory 50 to add a value of a speed width signal from speed width signal generator 70 to a value of the first command speed signal in such a manner to generate an addition signal indicative of the added value. At the same time, the adder 120 adds a value of a speed width signal from speed width signal generator 110 to the value of the first command speed signal from memory 50 to generate an addition signal indicative of the added value. Subsequently, the memory 90 memorizes a value of the addition signal from adder 80 to generate a second command speed signal indicative of the memorized value or a second command speed V2, and the memory 130 memorizes a value of the addition signal from adder 120 to generate a third command speed signal indicative of the memorized value or a third command speed V3. This means that manual actuation of switch 10 is maintained during an actuation time of less than two seconds upon reach of the actual vehicle speed V to the first command speed V1 to attain memorization of each of the first, second and third command speeds V1, V2 and V3 into the memories 50, 90 and 130 respectively.

When the set signal appears from the set-reset signal generator 30, as previously described, the drive circuit 151 generates a first drive signal in response to which the speaker 152 generates the alarm sound A. When the set signal disappears from the set-reset signal generator 30 in response to release of the manual switch 10, the speaker 152 cooperates with the drive circuit 151 to stop the alarm sound A. Thus, a driver of the vehicle can surely recognize the setting of the first to third command speeds V1 to V3 in the speed alarm system owing to the alarm sound A from speaker 152. In this case, the alarm sound A from speaker 152 cannot offend the ear of the driver, because generating time of the alarm sound A accords with the actuation time of manual switch 10 based on an intention of the driver. When a value of the speed signal from calculator 40 becomes smaller than each value of hysteresis signals appearing respectively from each of the subtracters 62, 101, 141 as decrease of the actual vehicle speed V, the comparators 63 of comparison circuits 60, 100, 140 produce a high level signal respectively, and the flip flops 65 of comparison circuits 60, 100, 140 are responsive to the high level signals from the comparators 63 of comparison circuits 60, 100, 140 respectively to produce a high level signal. When a value of the speed signal from calculator 40 exceeds a value of the first command speed signal from memory 50 in dependence upon change of the actual vehicle speed V from decrease to increase, the comparator 64 of comparison circuit 60 generates a high level signal which is applied to AND gate 66 of comparison circuit 60.

Then, AND gate 66 of comparison circuit 60 is responsive to the high level signal from comparator 64 of comparison circuit 60 during generation of the high level signal from flip flop 65 of comparison circuit 60 to produce an output signal upon receipt of which the speaker 152 cooperates with the drive circuit 151 to produce the alarm sound C, and simultaneously the timer 67 starts to measure the predetermined alarm time of four seconds. When the timer 67 generates a timer signal upon completing the measurement thereof, the high level signal from flip flop 65 of comparison circuit 60 disappears, and then the output signal from AND gate 66 of comparison circuit 60 disappears. Thus, the speaker 152 cooperates with the drive circuit 151 in response to the disappearance of the output signal from AND gate 66 of comparison circuit 60 to stop the alarm sound C. As a result, the driver can surely recognize excess of the actual vehicle speed V over the first command speed V1 owing to the alarm sound C different from the alarm sound A. In this case, the alarm sound C from speaker 152 cannot offend the ear of the driver, because generating time of the alarm sound C is properly limitted by the timer 67.

When the value of the speed signal from calculator 40 becomes larger than a value of the second command speed signal from memory 90 with further increase of the actual vehicle speed V, the comparator 64 of comparison circuit 100 generates a high level signal in response to which the AND gate 66 of comparison circuit 100 generates an output signal during generation of the high level signal from flip flop 65 of comparison circuit 100. Then, the speaker 152 cooperates with the drive circuit 151 responsive to the output signal from AND gate 66 of comparison circuit 100 to generate the alarm sound D, and simultaneously the timer 102 starts to measure the predetermined alarm time of six seconds. When the timer 102 produces a timer signal upon completing the measurement thereof, the alarm sound generator 150 stops the fourth alarm sound D under control of the flip flop 65 and AND gate 66 of comparison circuit 100. Thus, the driver can surely recognize excess of the actual vehicle speed V over the second command speed V2 owing to the alarm sound D different from each of the alarm sounds A to C. In this case, the alarm sound D cannot offend the ear of the driver, because a difference between generating times of the alarm sounds D and C are only two seconds.

When the value of the speed signal from calculator 40 becomes larger than a value of the third command speed signal from memory 130 with increase of the actual vehicle speed V, the comparator 64 of comparison circuit 140 produces a high level signal in response to which the AND gate 66 of comparison circuit 140 generates an output signal during generation of the high level signal from flip flop 65 of comparison circuit 140. Then, the alarm sound generator 150 receives the output signal from AND gate 66 of comparison circuit 140 to generate the alarm sound E, and simultaneously the timer 142 starts to measure the predetermined alarm time of eight seconds. When the timer 142 generates a timer signal upon completing the measurement thereof, the alarm sound generator 150 stops the alarm sound E under control of the flip flop 65 and AND gate 66. Thus, the driver can surely recognize excess of the actual vehicle speed V over the third command speed V3 owing to the alarm sound E different from the alarm sounds A to D. In this case, the alarm sound E cannot offend the ear of the driver, because a difference between generating times of the alarm sounds E and D is only two seconds.

When the manual switch 10 is manually actuated with an actuation time of more than two seconds to generate an actuation signal, the set-reset signal generator 30 generates a set signal upon receipt of which the alarm sound generator 150 generates the alarm sound A. Upon lapse of two seconds after appearance of the actuation signal from manual switch 10, the set-reset signal generator 30 ceases generation of the set signal and produces a reset signal therefrom. This means that the memories 50, 90, 130 cancel the first, second and third command speeds V1, V2, V3 respectively and also that the alarm sound generator 150 stops the alarm sound A and sequentially generates the alarm sound B. When the actuation signal disappears upon release of the manual switch 10, the reset signal disappears from the set-reset signal generator 30, and then the alarm sound B from alarm sound generator 150 stops. In other words, the driver can surely recognize cancellation of the first to third command speeds V1 to V3 owing to subsequent generation of the alarm sounds A and B different from each other based on the actuation time of more than two seconds of the manual switch 10. In this case, the alarm sounds A and B cannot offend the ear of the driver, because the sum of generating times of the alarm sounds A and B accords with the actuation time of switch 10 caused by an intention of the driver. Additionally, if there is no actuation of manual switch 10 over two seconds as described above, the memorized command speeds V1 to V3 may be maintained respectively in the memories 50, 90, 130 by cooperation of the constant voltage circuit S1 with the battery Ba after opening of the ignition switch SW.

Figure 5:
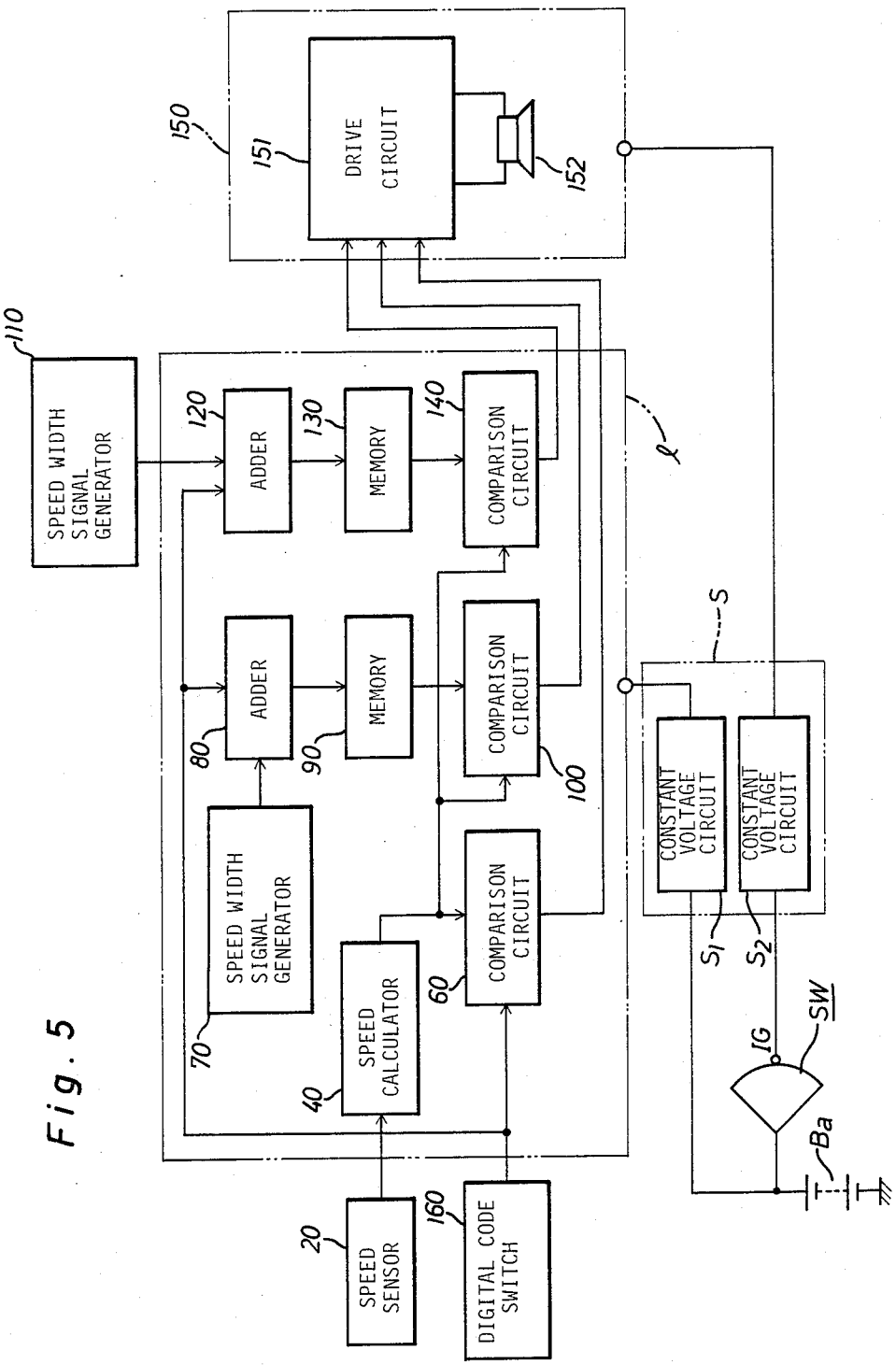
FIG. 5 shows a block diagram of a modification of the first embodiment.

FIG. 5 illustrates a modification of the first preferred embodiment in which the manual switch 10, set-reset signal generator 30 and memory 50 of the first embodiment are replaced with a digital code switch 160. The digital code switch 160 is manually actuated to produce a digital code signal indicative of the first command speed V1 which is applied to the comparison circuit 60, adders 80, 120 in replacement of the first command speed signal from memory 50. In addition, other construction and function of the modification is the same as those of the first preferred embodiment.

In operation, when the digital code switch 160 is manually actuated during travel of the vehicle with the ignition switch SW closed and produces a digital code signal indicative of the first command speed V1, the adder 80 adds the value of the speed width signal from speed width signal generator 70 to a value of the digital code signal from code switch 160 to produce an addition signal indicative of the added resultant value. The adder 120 also addes the value of the speed width signal from speed width signal generator 110 to the value of the digital code signal from code switch 160 to produce an addition signal indicative of the added resultant value. This means that memorization of the second and third command speeds V2, V3 respectively into memories 90, 130 can be attained in relation to the digital code signal from code switch 160 in the same manner as that of the first preferred embodiment. In addition, cancellation of the second and third command speeds V2, V3 from memories 90, 130 may be realized by disconnection of the constant voltage circuit S1 from the battery Ba. Other operation and its effect of the modification are substantially the same as those of the first preferred embodiment.

Figure 6:
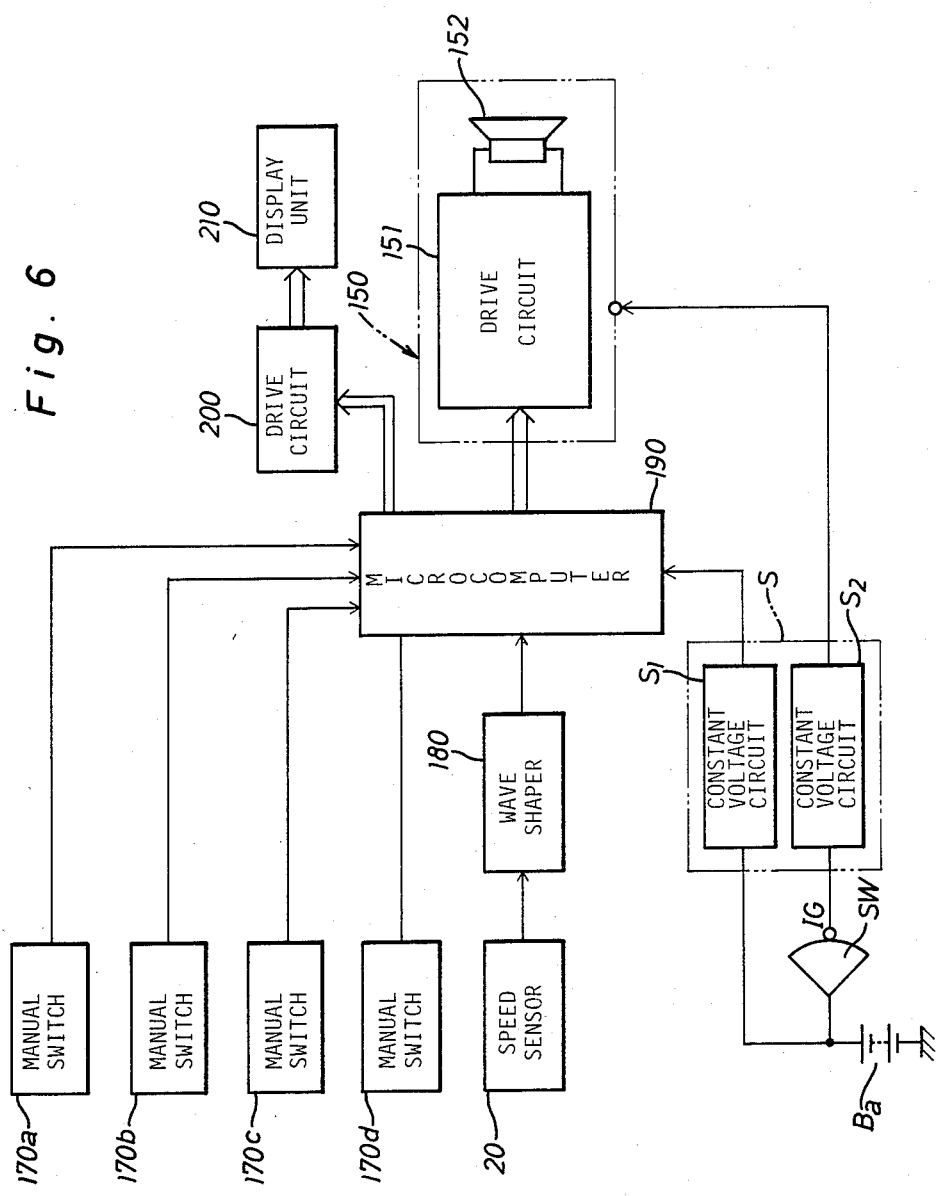
FIG. 6 illustrates a block diagram of a second preferred embodiment of the speed alarm system.

FIG. 6 illustrates a second preferred embodiment of the speed alarm system in accordance with the present invention which is provided with manual switches 170a to 170d, with a wave shaper 180 connected to the speed sensor 20 of the first embodiment and with a microcomputer 190 connected to the switches 170a to 170d, wave shaper 180 and the voltage stabilizer S of the first embodiment. Each of the manual switches 170a to 170d is in the form of the self-return push buttom type and mounted on the steering wheel of the vehicle respectively. The manual switch 170a generates a first actuation signal when manually actuated upon driver's request of setting (or cancelling) the first and second command speeds V1, V2 described in the first embodiment. The manual switch 170b generates a second actuation signal when manually actuated upon driver's request of displaying the actual vehicle speed V, the manual switch 170c generates a third actuation signal when manually actuated upon driver's request of displaying the first command speed V1, and the manual switch 170d generates a fourth actuation signal when manually actuated upon driver's request of displaying the second command speed V2.

The wave shaper 180 reshapes each of the pulse signals from speed sensor 20 into a reshaped pulse in sequence. The microcomputer 190 is ready for operation upon receipt of the first constant voltage from the constant voltage circuit S1 of stabilizer S and repetitively executes a main control program and first and second interrupt control programs in accordance with flow diagrams of FIGS. 7 to 11 to control the alarm sound generator 150 of the first embodiment and a drive circuit 200 for a display unit 210, as described later. In the embodiment, interruption of the first interrupt control program in the microcomputer 190 is repetitively permitted upon completing measurement of a predetermined time of 400 (msec.) by a timer provided in the microcomputer 190. The timer of microcomputer 190 is responsive to operation of the microcomputer 190 to repetitively the predetermined time of 400 (msec.). Furthermore, interruption of the second interrupt control program in the microcomputer 190 is repetitively permitted in response to each of the reshaped pulse from the wave shaper 180. Additionally, the main and interrupt control programs are previously memorized in the microcomputer 190. The display unit 210 is mounted on a proper portion in the vehicle compartment and cooperates with the drive circuit 200 under control of the microcomputer 190 to selectively display the actual vehicle speed V, first command speed V1 and second command speed V2, as described later.

OPERATION

Figure 7:
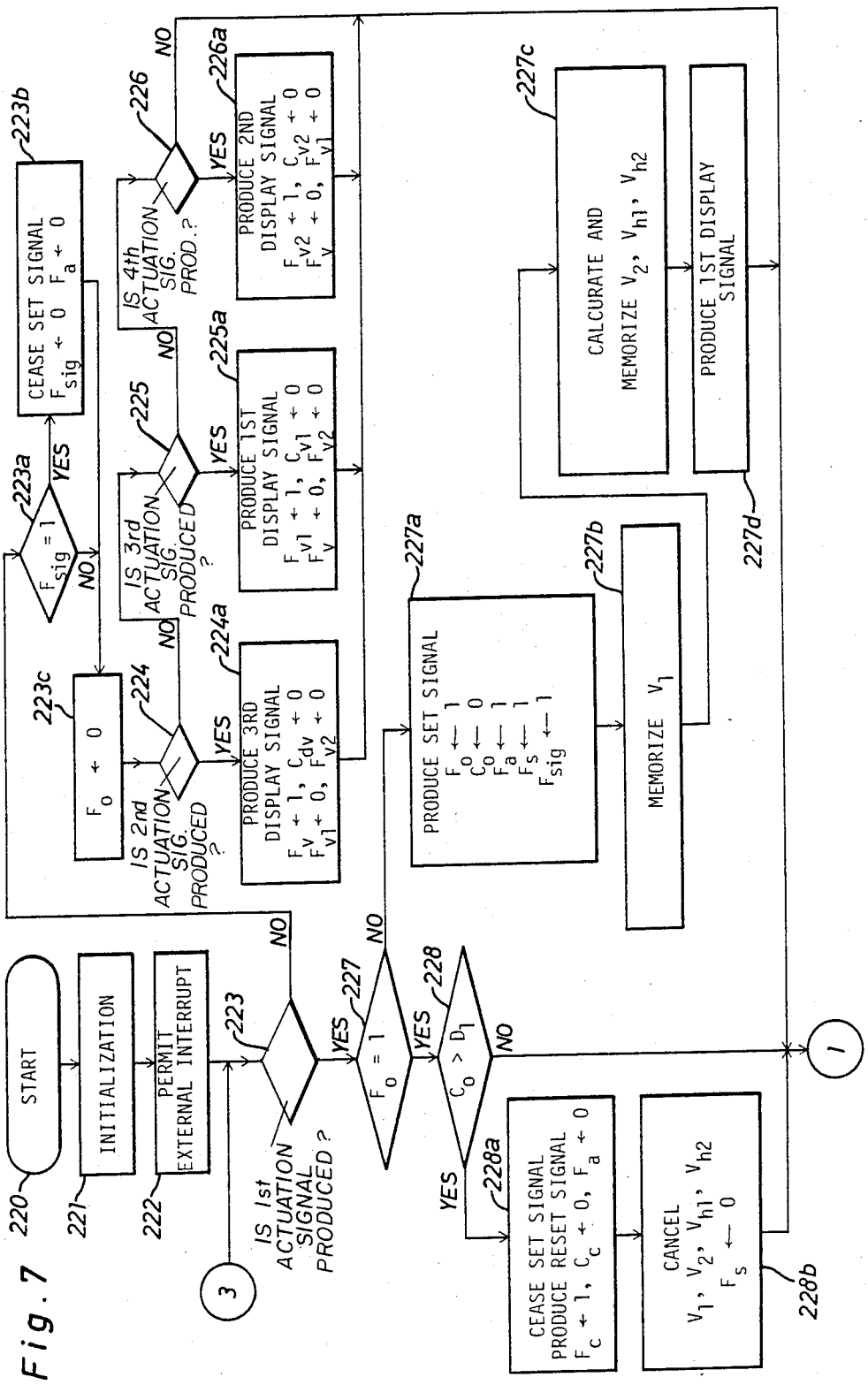
FIGS. 7 to 9 illustrate a flow diagram defining a main control program to be performed by the microcomputer shown in FIG. 6.
Figure 8:
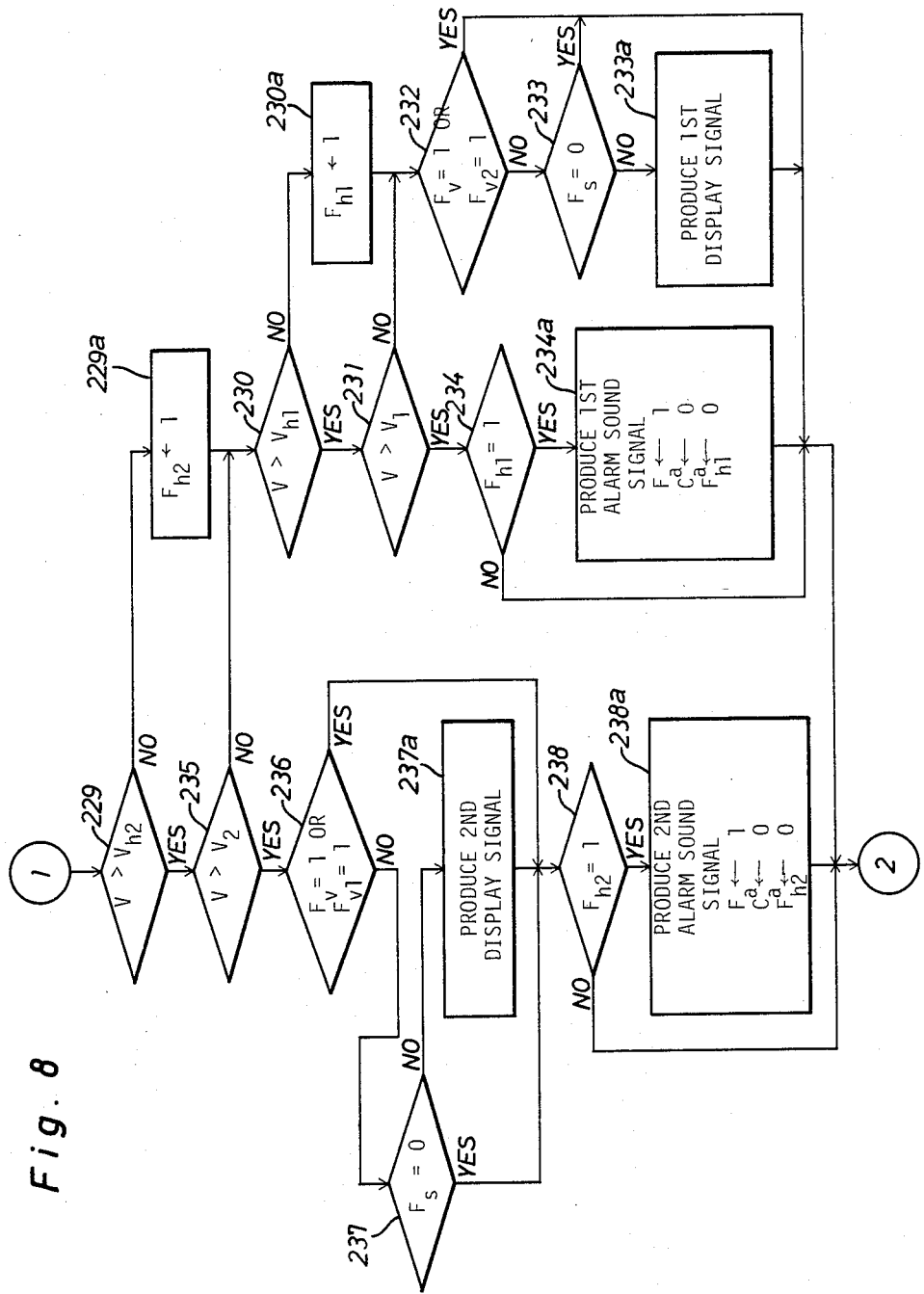
Figure 9:
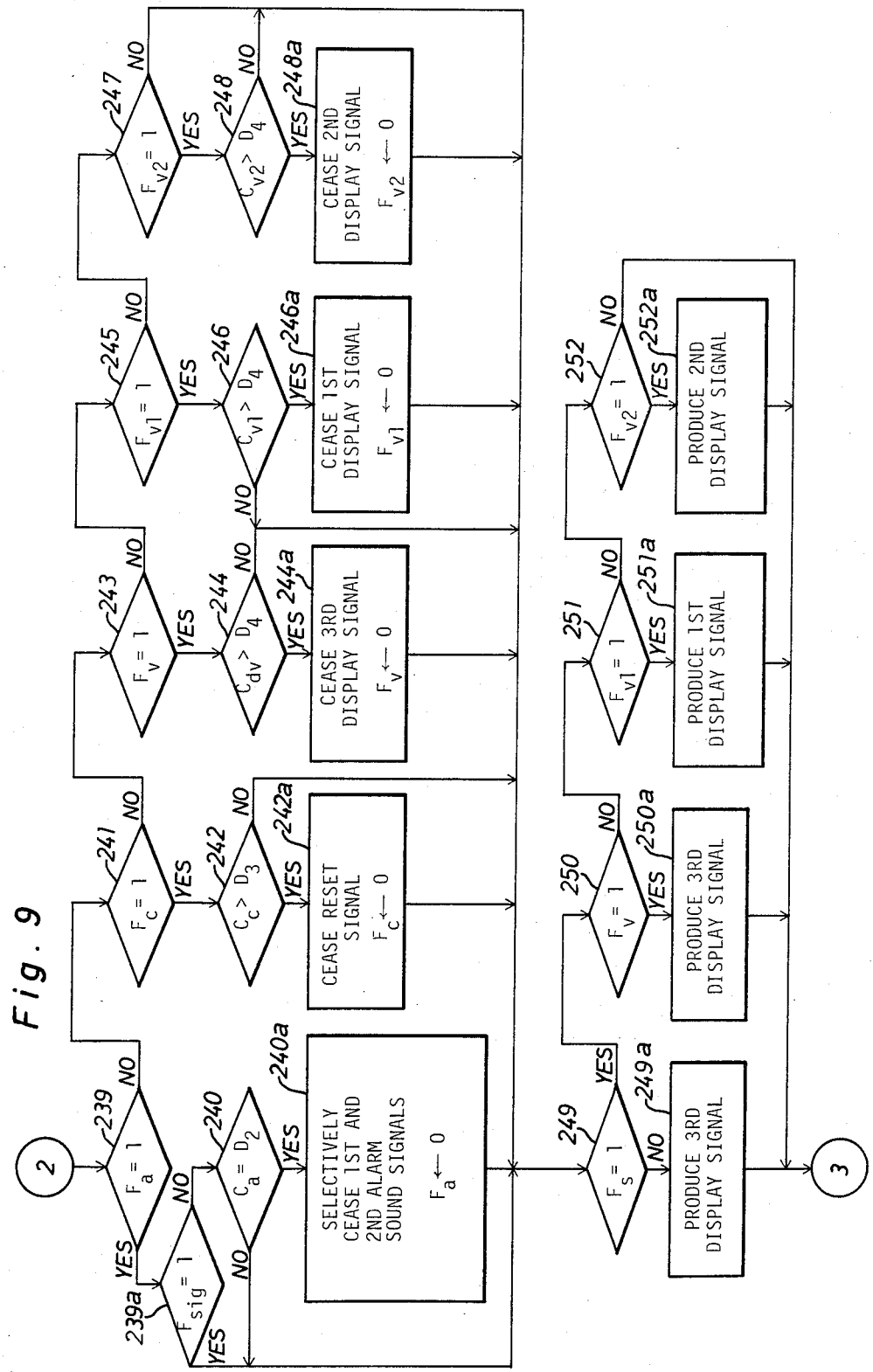

It is assumed that during arrest of the vehicle with the ignition switch SW opened, the microcomputer 190 is ready for operation in response to the first constant voltage from constant voltage circuit S1 and repetitively performs the main control program passing through steps 223, 223a, 223c, 224 to 226, 229, 229a, 230, 230a, 232, 233, 239, 241, 243, 245, 247, 249 and 249a in accordance with the flow diagrams of FIGS. 7 to 9. In this case, it is also assumed that the microcomputer 190 has already initiated execution of the main control program at a step 220 upon connection of the constant voltage circuit S1 to the battery Ba to be initialized at a step 221 and permit external interruption at a step 222. Additionally, the microcomputer 190 does not memorize therein any command speeds at this stage.

Figures 10, 11:
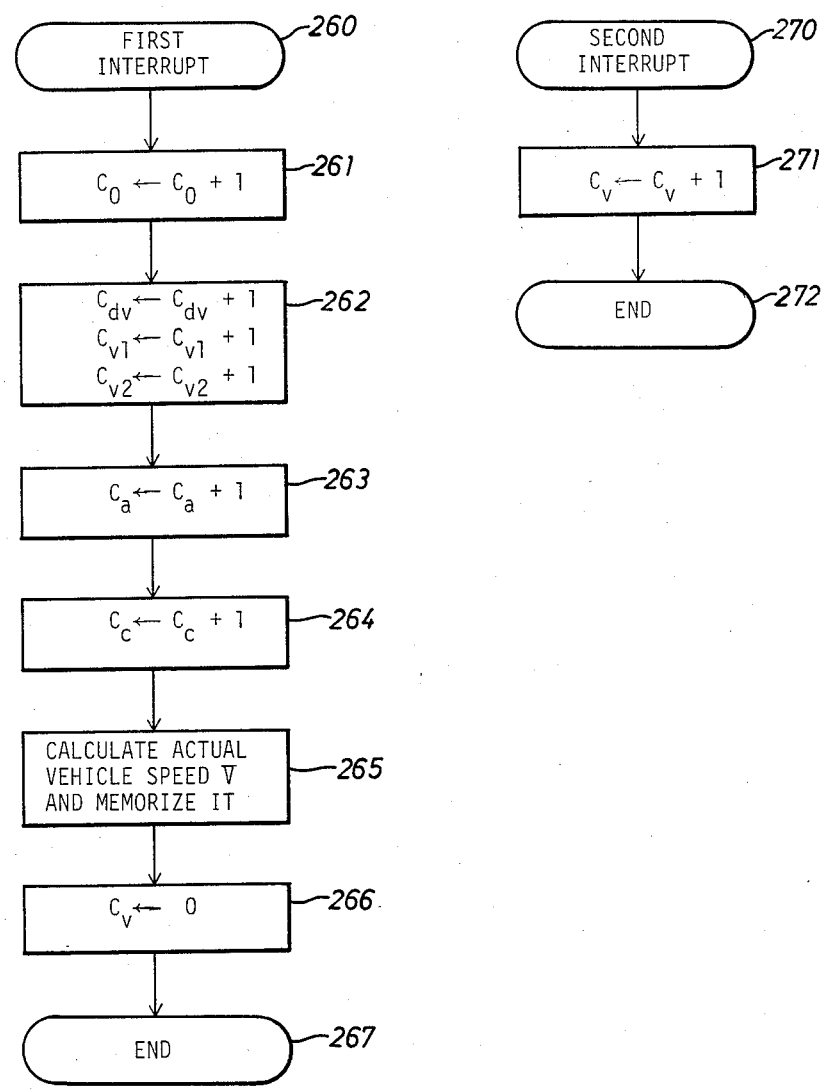
FIG. 10 shows a flow diagram defining a first interrupt control program to be executed by the microcomputer.
FIG. 11 shows a flow diagram defining a second interrupt control program to be executed by the microcomputer.

When the vehicle is started and accelerated with closure of ignition switch SW, the wave shaper 180 is responsive to a pulse signal issued from the speed sensor 20 in sequence to produce a series of reshaped signals upon receipt of which the microcomputer 190 repetitively executes the second interrupt control program in accordance with the flow diagram of FIG. 11. During the repetitive execution of the second interrupt control program, the microcomputer 190 is responsive to each of the reshaped signals from wave shaper 180 repetitively to add one to a value of a speed count data Cv at a step 271 so as to update the added value as the speed count data Cv. The microcomputer 190 also repetitively executes the first interrupt control program in accordance with the flow diagram of FIG. 10 upon completing each measurement of the timer of microcomputer 190. During the repetitive execution of the first interrupt control program, the microcomputer 190 calculates at a step 265 the actual vehicle speed V based on the speed count data Cv updated at step 271 and memorizes the calculated vehicle speed V. When the main control program proceeds to the step 249a, the microcomputer 190 generates a third display signal indicative of the calculated vehicle speed V memorized at step 265. Then, the drive circuit 200 is responsive to the third display signal from microcomputer 190 to produce a display drive signal upon receipt of which the display unit 210 displays the actual speed V of the vehicle.

When the driver visually recognizes increase of the actual vehicle speed V to the first command speed V1 from display unit 210 to actuate the manual switch 170a, the microcomputer 190 determines a "YES" answer at step 223 based on an first actuation sigual appearing from switch 170a and conversely determines a "NO" answer at a step 227 on a basis of a switch flag $F_o=0$ reset previously at step 223c. When the main control program proceeds to a step 227a, the microcomputer 190 produces a set signal indicative of the alarm sound A, sets the switch flag $F_o$ equal to one and resets a switch count data $C_o$ equal to zero. Then, the microcomputer 190 also sets an alarm flag $F_a$, a set flag $F_s$ and a signal flag $F_{sig}$ respectively equal to one. Subsequently, the microcomputer 190 memorizes at a step 227b the calculated vehicle speed V memorized at step 265 as the first command speed V1. When the main control program proceeds to a step 227c, the microcomputer 190 adds a predetermined value of, for instance, 10 km/h to the first commmand speed V1 to memorize the added resultant value as the second command speed V2. Then, the microcomputer 190 multiplies a constant of, for instance, 0.95 by the first command speed V1 to memorize the multiplied value 0.95 V1 as a first hysteresis speed Vh1 and also multiplies the constant of 0.95 by the second command speed V2 to memorize the multiplied value 0.95 V2 as a second hysteresis speed Vh2. Thereafter, the microcomputer 190 generates at a step 227d a first display signal indicative of the first command speed V1, determines at a step 239 a "YES" answer based on the alarm flag $F_a=1$ set at at step 227a and determines at a step 239a a "YES" answer based on the signal flag $F_{sig}=1$ set at step 227a. Subsequently, the microcomputer 190 determines at step 249 a "YES" answer on a basis of the set flag $F_s=1$ set at step 227a, determines at step 227 of FIG. 7 a "YES" answer based on the switch flag $F_o=1$ set at step 227a, and determines at a step 228 a "NO" answer based on the switch count data $C_o <$ a predetermined data $D_1$ indicative of two seconds previously memorized in the microcomputer 190.

When the set and first speed display signals appear from the microcomputer 190, as previously described, the alarm sound generator 150 is responsive to the set signal to generate the alarm sound A, and the drive circuit 200 is responsive to the first display signal from microcomputer 190 to produce a display drive signal in response to which the display unit 210 visually displays the first command speed V1. Thus, the driver can surely recognize the setting of the first and second command speeds V1, V2 into the microcomputer 190 owing to both of the audible alarm sound A from alarm sound generator 150 and the visual speed information from display unit 210.

After the reset of the switch count data $C_o=0$ described above, the microcomputer 190 is responsive to execution of the first interrupt control program repetitively to add one to a value of the switch count data $C_o$ so as to update the added value as the switch count data $C_o$ and resets the speed count data $C_V=0$. The microcomputer 190 is also responsive to execution of the main control program repetitively to determine a "NO" answer at step 228 and a "YES" answer at step 239a. When the first actuation signal from manual switch 170a disappears upon release of switch 170a, the microcomputer 190 determines a "NO" answer at step 223 and then determines a "YES" answer at a step 223a on a basis of the signal flag $F_{sig}=1$ to advance the main control program to a step 223b at which the set signal disappears and the alarm and signal flags $F_a$, $F_{sig}$ are reset equal to zero. Thus, the alarm sound generator 150 stops the alarm sound A in response to disappearance of the set signal from microcomputer 190. In this instance, the alarm sound A from generator 150 cannot offend the ear of the driver, because generating time of the alarm sound A accords with the actuated time of manual switch 170a based on an intention of the driver.

Upon completing execution of the main control program at step 223b, as previously described, the microcomputer 190 resets at a step 223c the switch flag $F_o=0$ to advance the main control program from the following step 224 to step 229. When the decision at step 229 is a "NO" answer as understood from the above description, the microcomputer 190 sets a hysteresis flag Fh2 equal to one at step 229a and determines a "YES" answer at step 230 to determine a "NO" answer sequentially at steps 231, 232. When the decision at the following step 233 is "NO" based on the set flag $F_s=1$ set at step 227a, the microcomputer 190 produces a first display signal upon receipt of which the display unit 210 cooperates with the drive circuit 200 to visually display the first command speed V1. Thereafter, the main control program proceeds from step 239 to step 252 through steps 247, 249. In addition, the hysteresis flag Fh2 corresponds to the second command speed Vs2.

When the actual vehicle speed V exceeds the first command speed V1, the microcomputer 190 determines at step 231 a "YES" answer based on the calculated vehicle speed V memorized at step 265 and in turn determines at a step 234 a "YES" answer in relation to a hysteresis flag Fh1 which was previously set equal to one at step 230a during increase of the actual vehicle speed V. Upon proceeding of the main control program to a step 234a, the microcomputer 190 produces a first alarm sound signal indicative of the alarm sound C, sets the alarm flag $F_a=1$ and resets an alarm count data $C_a=0$ and the hysteresis flag Fh1=0. When the first alarm sound signal appears from the microcomputer 190, as previously described, the alarm sound generator 150 generates the alarm sound C. Thus, the driver can surely recognize excess of the actual vehicle speed V over the first command speed V1 owing to the alarm sound C from generator 150. In addition, the hystersis flag Fh1 corresponds to the first command speed V1.

After the execution at step 234a of the main control program described above, the microcomputer 190 determines a "YES" answer at step 239 on a basis of the alarm flag $F_a=1$ set at step 234a, determines a "NO" answer at step 239a on a basis of the signal flag $F_{sig}=0$ reset at step 223b, determines a "NO" answer at a step 240 based on the alarm count data $C_a=0$ reset at step 234a and then returns the main control program to the step 223 through the steps 249 to 252. When the main control program proceeds to the step 234, as previously described, the microcomputer 190 determines a "NO" answer based on the hystresis flag Fh1=0 reset at step 234a and advances the main control program to the step 239. Furthermore, upon reset of the alarm count data $C_a=0$ described above, the microcomputer 190 is responsive to execution of the first interrupt control program repetitively to add one to a value of the alarm count data $C_a$ at a step 263 so as to update the added value as the alarm count data $C_a$. When the alarm count data $C_a$ reaches a predetermined data D2 indicative of two seconds memorized previously in microcomputer 190, the microcomputer 190 determines a "YES" answer at step 240 of FIG. 9 where the first alarm sound signal disappears and the alarm flag $F_a$ is reset equal to zero. Then, the alarm sound generator 150 is responsive to disappearance of the first alarm sound signal from microcomputer 190 to stop the alarm sound C. In this case, the alarm sound C from generator 150 cannot offend the ear of the driver, because generating time of the alarm sound C is limitted to the timer data D2 (or two seconds).

When the calculated vehicle speed V obtained at step 265 of FIG. 10 exceeds the second command speed V2, the microcomputer 190 determines a "YES" answer at steps 229, 235 of FIG. 8 in sequence and conversely determines a "NO" answer at steps 236, 237 in sequence to produce a second display signal indicative of the second command speed V2 at a step 237a. When the decision at the following step 238 is "YES" on a basis of the hysteresis flag Fh2=1 set at step 229a, the microcomputer 190 advances the main control program to a step 238a and produces a second alarm sound signal indicative of the alarm sound D to set the alarm flag $F_a=1$ and also to reset the alarm count data $C_a=0$ and the hysteresis flag Fh2=0. Then, the drive circuit 200 is responsive to the second display signal from microcomputer 190 to produce a display drive signal upon receipt of which the display unit 210 displays the second command speed V2, and the alarm sound generator 150 is responsive to the second alarm sound signal from microcomputer 190 to generate the alarm sound D. Thus, the driver can surely recognize excess of the actual vehicle speed V over the second command speed V2 owing to both the audible alarm sound D from generator 150 and the visual information from the display unit 210. In this case, display of the first command speed V1 by the display unit 210 during V<V2 is available for prediction of increase of the actual vehicle speed V to the second command speed V2, because the display unit 210 continuously displays the first command speed V1 during V<V2 and thereafter displays the second command speed V2 upon V=V2.

When the decision at step 239 is "YES" based on the alarm flag $F_a=1$ set at step 238a, the microcomputer 190 determines a "NO" answer sequentially at steps 239a, 240 based on the signal flag $F_{sig}=0$ and alarm count data $C_a=0$ respectively reset at steps 223b, 238a and returns the main control program to the step 223 through the steps 249 to 252. With further proceeding of the main control program to the step 238, the microcomputer 190 determines a "NO" answer on a basis of the hysteresis flag Fh2=0 reset at step 238a and advances the main control program to the step 239 and thereafter. Furthermore, after the above reset of the alarm count data $C_a=0$, the microcomputer 190 is responsive to execution of the first interrupt control program repetitively to add one to a value of the alarm count data $C_a$ at step 263 so as to update the added value as the alarm count data $C_a$. When the alarm count data $C_a$ reaches the predetermined data D2, the microcomputer 190 determines a "YES" answer at step 240 to advance the main control program to the step 240a at which the second alarm sound signal disappears and the alarm flag $F_a$ is reset equal to zero. Then, the alarm sound generator 150 is responsive to disappearance of the second alarm sound signal from microcomputer 190 to stop the alarm sound D. In this instance, the alarm sound D cannot offend the ear of the driver, because generating time of the alarm sound D is limitted to the predetermined data $D_2$ (or two seconds).

When the actual vehicle speed V decreases to a value between the second command speed V2 and the second hysteresis speed Vh2, the microcomputer 190 determines a "NO" answer at step 235 of FIG. 8 and conversely determines a "YES" answer sequentially at steps 230, 231 to determine a "NO" answer at step 234 based on the hysteresis flag Fh1=0 reset at step 234a. When the actual vehicle speed V further decreases to a value between the second hysteresis speed Vh2 and the first command speed V1, the microcomputer 190 determines a "NO" answer at step 229, sets the hysteresis flag Fh2=1 at step 229a and then advances the main control program through steps 230, 231 to the step 234 to determine a "NO" answer.

When the actual vehicle speed V decreases to a value between the first command speed V1 and the first hysteresis speed Vh1, the microcomputer 190 determines a "NO" answer sequentially at steps 231, 232, 233 and produces at step 233a a first display signal upon receipt of which the display unit 210 cooperates with the drive circuit 200 to display the first command speed V1. Thus, the driver can visually recognize decrease of the actual vehicle speed V to less than the first command speed V1. In this case, display of the second command speed V2 by the display unit 210 during V>Vh1 is available for prediction of decrease of the actual vehicle speed V to the first command speed V1, because the display unit 210 continuously displays the second command speed V2 during V>Vh1 and thereafter displays the first command speed V1 upon V=Vh1. When the decision at step 230 is "NO" because of further decrease of the actual vehicle speed V to less than the first hysteresis speed Vh1, the microcomputer 190 sets the hysteresis flag Fh1=1 and advances the main control program through steps 232, 233 to step 233a to produce a first display signal in response to which the display unit 210 cooperates with the drive circuit 200 to display the first command speed V1.

If a second actuation signal appears temporarily from the manual switch 170b during the above-noted increase or decrease of the actual vehicle speed V, the microcomputer 190 determines a "YES" answer at step 224 to produce a third display signal indicative of the actual vehicle speed V at a step 224a. At the step 224a, the microcomputer 190 also sets a display flag $F_v=1$ and resets a display count data $C_{dv}=0$ and display flags Fv1=Fv2=0. Then, the microcomputer 190 determines a "YES" answer at step 243 because of the display flag $F_v=1$ and conversely determines a "NO" answer at a step 244 based on the display count data $C_{dv}=0$. When the decision at step 249 is a "YES" answer based on the set flag $F_s=1$, the microcomputer 190 determines a "YES" answer at step 250 on a basis of $F_v=1$ to produce a third display signal. Then, the display unit 210 cooperates with the drive circuit 200 in response to the third display signal from microcomputer 190 to display the actual vehicle speed V. Thus, the driver can visually recognize the actual vehicle speed V from the display unit 210. This means that the driver may utilize the speed alarm system as a speedometer for the vehicle only by actuation of the manual switch 170b. In this case, the decision "YES" at step 232 or 236 based on the display flag $F_v=1$ set at step 224a may inhibit switchover of visual information of display unit 210 from the actual vehicle speed V into the first or second command speed V1 or V2 during proceeding of the main control program to step 250a.

After reset of the display count data $C_{dv}$ described above, the microcomputer 190 is responsive to execution of the first interrupt control program repetitively to add "one" to a value of the display count data $C_{dv}$ at step 262 and update the added value as the display count data $C_{dv}$. When the display count data $C_{dv}$ is larger than a predetermined data $D_4$ indicative of three seconds previously memorized in the microcomputer 190, the microcomputer 190 determines a "YES" answer at step 244 where the third display signal disappears and the display flag $F_v$ is reset equal to zero. Thus, the display unit 210 is responsive to disappearance of the third display signal from microcomputer 190 to stop visual indication of the actual vehicle speed V. In addition, even if the manual switch 170c or 170d is erroneously actuated during display of the actual vehicle speed V of display unit 210, the previous reset of display flags $F_{v1}=F_{v2}=0$ at step 224a may inhibit an erroneous determination "YES" by the microcomputer 190 at step 251 or 252.

When the manual switch 170c is temporarily actuated during the above-mentioned operation, the microcomputer 190 determines a "YES" answer at a step 225 to advance the main control program to the following step 225a where it produces a first display signal indicative of the first command speed V1, sets the display flag $F_{v1}=1$, resets the display count data $C_{v1}=0$ and the display flags $F_v=F_{v2}=0$ respectively. Then, the microcomputer 190 determines a "YES" answer at step 245 based on the display flag $F_{v1}=1$ and conversely determines a "NO" answer at a step 246 based on the display count data $C_{v1}<$ the predetermined data $D_4$. When the decision at step 251 is "YES" on a basis of the display flag $F_{v1}=1$, the microcomputer 190 produces at the following step 251a a first display signal upon receipt of which the microcomputer 190 cooperates with the drive circuit 200 to display the first command speed V1. This means that even if he cannot remember the first command speed V1, the driver may visually recognize the first command speed V1 based on visual information from the display unit 210 given by actuation of the manual switch 170c. In this case, the decision "YES" at step 236 based on the display flag $F_{v1}=1$ set at step 225a may inhibit switchover of visual information of display unit 210 from the first command speed V1 to the second command speed V2.

When the first interrupt and main control programs are repetitively performed after reset of the display count data $C_{v1}$ at step 225a, the microcomputer 190 repetitively adds "one" to a value of the display count data $C_{v1}$ at step 262 of the first interrupt control program and updates the added value as the display count data $C_{v1}$. The microcomputer 190 also determines a "NO" answer at step 225 of the main control program based on disappearance of the third actuation signal from manual switch 170c and determines a "NO" answer at step 246 on a basis of the display count data $C_{v1} \leq$ the predetermined data $D_4$. Then, the microcomputer 190 determines a "YES" answer at step 251 on a basis of the display flag $F_{v1}=1$ to produce at a step 251a a first display signal in response to which the display unit 210 cooperates with the drive circuit 200 to display the first command speed V1. When the display count data $C_{v1}$ exceeds the predetermined data $D_4$, the microcomputer 190 determines a "YES" answer at step 246 to advance the main control program to a step 246a where the first display signal from microcomputer 190 disappears and the visual indication of the first command speed V1 from the display unit 210 is stopped. Simultaneously, the microcomputer 190 resets the display flag $F_{v1}=0$ to determine a "NO" answer at step 251. In addition, even if the manual switch 170b or 170d is erroneously actuated during display of the first command speed V1 of display unit 210, the previous reset of the display flags $F_v=F_{v2}=0$ at step 225a may inhibit an erroneous determination "YES" by the microcomputer 190 at step 250 or 252.

When the manual switch 170d is temporarily actuated during the above-noted operation, the microcomputer 190 determines a "YES" anwer at step 226 on a basis of a fourth actuation signal appearing from switch 170d and advances the main control program to the following step 226a. Then, the microcomputer 190 generates a second display signal indicative of the second command speed V2, sets the display flag $F_{v2}=1$ and resets the display count data $C_{v2}=0$ and the display flags $F_v=F_{v1}=0$ respectively. When the decision at step 247 is "YES" based on the display flag $F_{v2}=1$, the microcomputer 190 determines a "NO" answer at step 248 because of the display count data $C_{v2}<$ the predetermined data $D_4$ and conversely determines a "YES" answer at step 252 on a basis of the display flag $F_{v2}=1$ to produce a second display signal at step 252a. Then, the display unit 210 cooperates with the drive circuit 200 responsive to the second display signal from microcomputer 190 to visually display the second command speed V2. This means that even if he cannot remember the second command speed V2, the driver may visually recognize the second command speed V2 based on visual information from the display unit 210 given by actuation of the manual switch 170d. In this case, the decision "YES" at step 232 based on the display flag $F_{v2}=1$ set at step 226a may inhibit switchover of visual information of display unit 210 from the second command speed V2 to the first command speed V1.

When the first interrupt and main control programs are repetitively performed after reset of the display count data $C_{v2}$ described above, the microcomputer 190 repetitively adds one to a value of the display count data $C_{v2}$ at step 262 of the first interrupt control program and updates the added value as the display count data $C_{v2}$. The microcompter 190 also determines a "NO" answer at step 226 of the main control program based on disappearance of the fourth actuation signal from manual switch 170d and, in turn, determines a "NO" answer at step 248 because of the display count data $C_{v2} \leqq$ the predetermined data $D_4$. Then, the microcomputer 190 determines a "YES" answer at step 252 on a basis of the display flag $F_{v2}=1$ to generate at the following step 252a a second display signal upon receipt of which the microcomputer 190 cooperates with the drive circuit 200 to display the second command speed V2. When the display count data $C_{v2}$ exceeds the predetermined data $D_4$, the microcomputer 190 determines a "YES" answer at step 248 to advance the main control program to the step 248a where the second display signal from the microcomputer 190 disappears and the visual display of the second command speed V2 from the display unit 250 is stopped. At the same time, the microcomputer 190 resets the display flag $F_{v2}=0$ to determine a "NO" answer at step 252. In addition, even if the manual switch 170b or 170c is erroneously actuated during display of the second command speed V2 of display unit 210, the previous reset of the display flags $F_v=F_{v2}=0$ at step 226a may inhibit an erroneous determination "YES" by the microcomputer 190 at step 250 or 251.

When the manual switch 170a is actuated after travel of the vehicle described above to generate a first actuation signal, the microcomputer 190 determines a "YES" answer at step 223 of FIG. 7 to conversely determine a "NO" answer at step 227 because the switch flag $F_o=0$ at step 223c. When the main control program proceeds to the following step 227a, the microcomputer 190 produces a set signal in response to which the alarm sound generator 150 generates the alarm sound A. At the step 227a, the microcomputer 190 also sets the switch flag $F_o=1$, resets the switch count data $C_o=0$, sets the alarm flag $F_a=1$, maintains the set flag $F_s=1$ and sets the signal flag $F_{sig}=1$. When the decision at step 239 is "YES" based on the alarm flag $F_a=1$, the microcomputer 190 determines a "YES" answer at step 239a because of the signal flag $F_{sig}=1$ and also determines a "YES" answer at step 249 based on the set flag $F_s=1$ to return the main control program to step 223 through steps 250 to 252. When the decision at step 223 is "YES" because the first actuation signal from manual switch 170a is continuously maintained, the microcomputer 190 determines a "YES" answer at step 227 on a basis of the set flag $F_o=1$ to conversely determine a "NO" answer at step 228.

When the switch count data $C_o$ updated repetitively at step 261 of the first interrupt control program after the reset thereof at step 227a exceeds the predetermined data $D_1$, the microcomputer 190 determines a "YES" answer at step 228 to advance the main control program to the following step 228a. Then, the microcomputer 190 ceases generation of the set signal to generate a reset signal and sets the cancel flag $F_c=1$ to reset the cancel count data $C_c=0$ and the alarm flag $F_a=0$. Thereafter, the microcomputer 190 cancels the command speeds V1, V2 and hysteresis speeds Vh1, Vh2 at a step 228b to reset the set flag $F_s=0$. When the reset signal appears from the microcomputer 190 immediately after disappearance of the set signal, as previously described, the alarm sound generator 150 stops the alarm sound A in response to disappearance of the set signal and subsequently generates the alarm sound B in response to the reset signal from the microcomputer 190.

After execution at step 228b as described above, the microcomputer 190 determines a "NO" answer at step 239 because of the alarm flag $F_a=0$ reset at step 228a and conversely determines a "YES" answer at step 241 based on the cancel flag $F_c=1$. When the decision at the following step 242 is "NO" because of the cancel count data $C_c=0$ at this stage, the microcomputer 190 determines a "NO" answer at step 249 because of the set flag $F_s=0$ reset at step 228b and advances the main control program to the following step 249a and thereafter. When the driver releases the manual switch 170a upon hearing of the alarm sound B from the alarm sound generator 150, the microcomputer 190 determines a "NO" answer at step 223 because of disappearance of the first actuation signal from manual switch 170a, determines a "YES" answer at step 223a based on the signal flag $F_{sig}=1$ set at step 227a, and resets the signal flag $F_{sig}=0$ in such a manner to advance the main control program to step 223c and thereafter. Furthermore, during repetitive execution of the first interrupt control program after reset of the cancel count data $C_c$ described above, the microcomputer 190 repetitively adds one to a value of the cancel count data $C_c$ at a step 264 and updates the added resultant value as the cancel count data $C_c$.

When the cancel count data $C_c$ exceeds a predetermined data $D_3$ indicative of 0.5 seconds previously memorized in the microcomputer 190, the microcomputer 190 determines a "YES" answer at step 242 to advance the main control program to the following step 242a where the reset signal from the microcomputer 190 disappears and the cancel flag $F_c$ is reset equal to zero. Then, the microcomputer 190 is responsive to disappearance of the reset signal from microcomputer 190 to stop the alarm sound B. As understood from the above description, the alarm sound generator 150 generates the alarm sound A by actuation of the manual switch 170a for 2 seconds and subsequently generates the alarm sound B by subsequent actuation of the manual switch 170a after lapse of 2 seconds. As a result, the driver can surely recognize cancel of the command speeds V1, V2 and hysteresis speeds Vh1, Vh2 from the microcomputer 190 owing to both the above-noted subsequent alarm sounds A, B from the alarm sound generator 150. In this case, the alarm sounds A, B from generator 150 cannot offend the ear of the driver, because the sum 2.5 seconds of generating times of the alarm sounds A, B accords substantially with the actuation time of the manual switch 170a based on an intention of the driver. In addition, the memorized command speeds V1, V2 may be maintained in the microcomputer 190 under cooperation of the constant voltage circuit S1 with the battery Ba after opening of the ignition switch SW in the same as in the first embodiment.

In the second embodiment, the microcomputer 190 is arranged to memorize the first and second command speeds V1, V2 at steps 227b, 227c of the main control program in response to the first actuation signal from manual switch 170a and to cancel the command speeds V1, V2 when generating time of the first actuation signal from the manual switch 170a exceeds 2 seconds. However, microcomputer 190 may be also arranged to memorize the first command speed V1 based on generating time 1 second of the first actuation signal, to memorize the second command speed V2 based on generating time 2 seconds of the first actuation signal, to cancel the first command speed V1 based on generating time 3 seconds of the first actuation signal and to cancel the second command speed V2 based on generating time 4 seconds of the first actuation signal.

Although in the second embodiment each of the predetermined data $D_1$, $D_2$ indicates 2 seconds and the predetermined data $D_3$ and $D_4$ indicate 3 seconds and 0.5 seconds respectively, the time indicated by each of the predetermined data $D_1$ to $D_4$ may also be modified in necessity.

Figure 15:
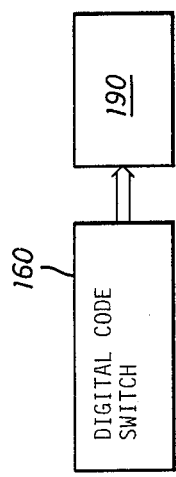
FIG. 15 shows a flow diagram defining a third interrupt control program to be executed by the microcomputer.
Figure 14:
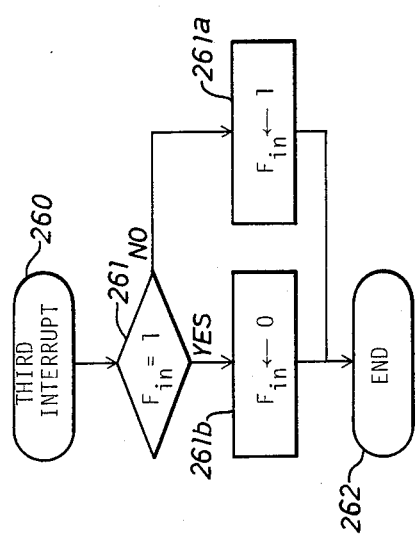

FIGS. 12 to 15 illustrate a modification of the second embodiment in which the main control program described above is partly modified as shown in FIGS. 12 to 14 and a third interrupt control program shown by a flow diagram of FIG. 15 is additionally memorized previously in the microcomputer 190 of the second embodiment. In the modification, interruption of the third interrupt control program in the microcomputer 190 is repetitively permitted upon completing measurement of a predetermined time of 0.5 seconds by an additional timer provided in the microcomputer 190. The additional timer of the microcomputer 190 is responsive to operation of the microcomputer 190 to repetitively measure the predetermined time of 0.5 seconds.

In operation, the microcomputer 190 repetitively executes the third interrupt control program in accordance with the flow diagram of FIG. 15 upon compeleting each measurement of the additional timer of microcomputer 190. If an intermittency flag $F_{in}$ is set at a step 261a during the preceding execution of the third interrupt control program, the microcomputer 190 determines a "YES" answer at a step 261 during the following execution of the third interrupt control program to reset the intermittency flag $F_{in}=0$ at a step 261b. If the intermittency flag $F_{in}$ is conversely reset equal to zero at step 261b during the preceding execution of the third interrupt control program, the microcomputer 190 determines a "NO" answer at step 261 during the following execution of the third interrupt control program to set the intermittency flag $F_{in}=1$ at step 261a. This means that the intermittency flag $F_{in}$ is intermittently set equal to zero by the microcomputer 190 during repetitive execution of the third interrupt control program.

If the decision at step 232 of the modified main control program is "NO", as previously described, the microcomputer 190 determines at a step 232a of FIG. 12 whether or not the alarm flag $F_a=1$. If the alarm flag $F_a=0$ at this stage, the microcomputer 190 determines a "NO" answer at step 232a to advance the modified main control program through steps 239, 250 to a step 252b of FIG. 14. If the set flag $F_s=0$ at this stage, the microcomputer 190 determines a "YES" answer to produce a third display signal at the following step 252c. Then, the display unit 210 cooperates with the drive circuit 200 in response to the third display signal from microcomputer 190 to display the actual vehicle speed V. This means that the speed alarm system may act a role as the speedometer on a basis of the alarm flag $F_a=0$ irrespective of the set flag $F_s$. If the decision at the above step 252b is "NO", the microcomputer 190 returns the modified main control program to step 223 of FIG. 7. This prevents that the driver erroneously recognize the actual vehicle speed V as the command speed V1 or V2 from the visual indication of dispaly unit 210.

If the decision at the above step 232a is conversely "YES", the microcomputer 190 advances the modified main control program to step 233. If the decision at step 233 is "NO", as previously described in the second embodiment, the microcomputer 190 determines a "YES" answer at a step 233b of FIG. 12 in relation to the intermittency flag $F_{in}=1$ set at step 261a, or conversely determines a "NO" answer at step 233b in relation to the intermittency flag $F_{in}=0$ reset at step 261b. This means that the microcomputer 190 produces a first display signal at step 233a upon the decision "YES" at step 233b or conversely ceases generation of the first display signal at a step 233c of FIG. 12 upon the decision "NO" at step 233b. Thus, under cooperation with the drive circuit 200, the display unit 210 displays the first command speed V1 in response to the first display signal from microcomputer 190 and conversely stops display of the first command speed V1 in response to disappearance of the first display signal from microcomputer 190. In other words, the display unit 210 cooperates with the drive circuit 200 under control of the microcomputer 190 to intermittently display the first command speed V1 during the alarm flag $F_a=1$. This means that the driver can correctly recognize the first command speed V1 from the intermittent indication of the display unit 210.

If the decision at step 236 of the modified main control program is "NO", as previously described, the microcomputer 190 determines at a step 236a of FIG. 13 whether or not the alarm flag $F_a=1$. If the alarm flag $F_a=0$ at this stage, the microcomputer 190 determines a "NO" answer at step 236a to advance the modified main control program through steps 238, 239, 250 to step 252b of FIG. 14. If the set flag $F_s=0$ at this stage, the microcomputer 190 determines a "YES" answer to produce a third display signal at the following step 252c. Then, the display unit 210 cooperates with the drive circuit 200 in response to the third display signal from microcomputer 190 to display the actual vehicle speed V. This means that the speed alarm system may act a role as the speedometer on a basis of the alarm flag $F_a=0$ irrespective of the set flag $F_s$. If the decision at the above step 252b is "NO", the microcomputer 190 returns the modified main control program to step 223. This prevents that the driver erroneously recognize the actual vehicle speed V as the command speed V1 or V2 from the visual indication of display unit 210.

If the decision at the above step 236a is conversely "YES", the microcomputer 190 advances the modified main control program to step 237. If the decision at step 237 is "NO", as previously described, the microcomputer 190 determines a "YES" answer at a step 237b of FIG. 13 in relation to the intermittency flag $F_{in}=1$ set at step 261a, or conversely determines a "NO" answer at step 237b in relation to the intermittency flag $F_{in}=0$ reset at step 261b. This means that the microcomputer 190 produces a second display signal at step 237a upon the decision "YES" at step 237b or conversely ceases generation of the second display signal at a step 237c of FIG. 13 upon the decision "NO" at step 237b. Thus, under cooperation with the drive circuit 200, the display unit 210 displays the second command speed V2 in response to the second display signal from microcomputer 190 and conversely stops display of the second command speed V2 in response to disappearance of the second display signal from the microcomputer 190. In other words, the display unit 210 cooperates with the drive circuit 200 under control of the microcomputer 190 to intermittently display the second command speed V2 during the alarm flag $F_a=1$. This means that the driver can correctly recognize the second command speed V2 from the intermittent indication of the display unit 210.

Figure 16:
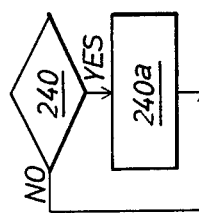
FIG. 16 shows a partial modification of the second preferred embodiment.

FIG. 16 illustrates another modification of the second embodiment in which the digital code switch 160 described in the modification of the first embodiment is connected to the microcomputer 190. In the modification, the microcomputer 190 is arranged to add a value of the digital code signal from code switch 160 in replacement of the predetermined speed width 10 Km/h to the first command speed V1 at step 227c so as to memorize the added resultant value as the second command speed V2.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed:

1. A speed alarm system for an automotive vehicle, comprising:
   first means for producing a speed signal indicative of the actual speed of the vehicle;
   processing means for: (1) producing a first command speed signal indicative of a first command speed, (2) producing a speed width signal indicative of a predetermined speed width, (3) adding a value of said speed width signal to a value of said first command speed signal to produce a second command speed signal indicative of a second command speed defined by the added value, (4) producing a first output signal when a value of said speed signal exceeds the first command speed, and for maintaining it for a first predetermined alarm time, (5) producing a second output signal when the value of said speed signal exceeds the second command speed, and for maintaining it for a second predetermined alarm time, (6) producing a first command speed display signal indicative of the first command speed when the value of said speed signal exceeds the value of said first command speed signal and maintaining it until the value of said speed signal reaches the value of said second command speed signal or the value of said speed signal decreases below the value of said first command speed signal, (7) producing a second command speed display signal indicative of the second command speed when the value of said speed signal exceeds the value of said second command speed signal and maintaining said second command speed display signal while the value of said speed signal is maintained in a value larger than the value of said first command speed signal;
   means responsive to said first and second output signals for generating first and second alarm sounds respectively; and
   a single display means responsive to said first and second command speed display signals for producing different displays corresponding to said first and second command speeds, respectively.

2. A speed alarm system for an automotive vehicle as claimed in claim 1, wherein:
   said apparatus further comprises manually actuable switch means for generating an actuation signal;
   said procuessing means, in performing said function (1) produces a set signal when said actuation signal is maintained for a first predetermined duration time, produces a reset signal when said actuation signal is maintained for a second predetermined duration time longer than said first time, stores the value of said speed signal in response to said set signal to produce said first command speed signal indicative of said first command speed and cancels said stored first command speed signal in response to said reset signal; and
   said alarm sounds generating means is further responsive to said set and reset signals for generating third and fourth alarm sounds respectively.

3. A speed alarm system for an automotive vehicle as claimed in claim 1, further comprising a manually actuable digital code switch for producing said first command speed signal indicative of said first command speed.

4. A speed alarm system for an automotive vehicle as claimed in claim 1, wherein:
   said apparatus further comprises manually actuable switch means for generating an actuation signal;

said processing means, in performing said function (1), produces a set signal when said actuation signal is maintained for a first predetermined duration time, produces a reset signal when said actuation signal is maintained for a second predetermined duration time longer than said first time, stores the value of said speed signal in response to said set signal to produce said first command speed signal indicative of said first command speed and cancels said stored first command speed signal in response to said reset signal;

said alarm sounds generating means is further responsive to said set and reset signals for generating third and fourth alarm sounds respectively; and said procuessing means is further responsive to said set signal for producing said first command speed display signal.

5. A speed alarm system for an automotive vehicle as claimed in claim 1, further comprising:

manually actuable switch means for producing an actuation signal;

said processing means being further responsive to said actuation signal for producing a speed display signal indicative of the actual vehicle speed; and said display means being further responsive to said speed display signal for displaying the actual vehicle speed.

6. A speed alarm system for an automotive vehicle as claimed in claim 5, further comprising:

second manually actuable switch means for producing a second actuation signal when the second command speed is displayed by said display means;

said processing means being further responsive to said second actuation signal for producing said first command speed display signal to cause said display means to display said first command speed.

7. A speed alarm system for an automotive vehicle as claimed in claim 6, further comprising:

third manually actuable swtich means for producing a third actuation signal when the first command speed is displayed by said display means;

8. A speed alarm system for an automotive vehicle, comprising:

means for producing a speed signal indicative of the actual speed of the vehicle;

processing means for: (1) producing a first command speed signal indicative of a first command speed, (2) producing a speed width signal indicative of a predetermined speed width, (3) adding a value of said speed width signal to a value of said first command speed signal to produce a second command speed signal indicative of a second command speed defined by the added value, (4) producing a first output signal when a value of said speed signal exceeds the first command speed, and for maintaining it for a first predetermined alarm time, (5) producing a second output signal when the value of said speed signal exceeds the second command speed, and for maintaining it for a second predetermined alarm time, (6) intermittently generating a first command speed display signal indicative of the first command speed in response to said first output signal, (7) intermittently generating a second command speed display signal indicative of the second command speed in response to said second output signal, and (8) producing a speed display signal indicative of the actual vehicle speed while said first and second output signals are not generated;

means, responsive to said first and second output signals, for generating first and second alarm sounds respectively; and display means responsive to said first and second command speed display signals for intermittently displaying the first and second command speeds respectively, and further responsive to said speed display signal for displaying the actual vehicle speed when said first and second command speeds are not being displayed.

9. A speed alarm system for an automotive vehicle as claimed in claim 8, wherein:

said apparatus further comprises manually actuable switch means for generating an actuation signal;

said processing means, in performing said function (1), produces a set signal when said actuation signal is maintained for a first predetermined duration time, produces a reset signal when said actuation signal is maintained for a second predetermined duration time longer than said first time, stores the value of said speed signal in response to said set signal to produce said first command speed signal indicative of said first command speed and cancels said stored first command speed signal in response to said reset signal; and said alarm sound generating means is further responsive to said set and reset signals for generating third and fourth alarm sounds respectively.

* * * * *